United States Patent [19]
Fushimi et al.

[11] Patent Number: 5,506,776
[45] Date of Patent: Apr. 9, 1996

[54] STEERING CONTROL SYSTEM FOR VEHICLE

[75] Inventors: Takehiko Fushimi, Kariya; Hisayasu Mase, Handa; Takeshi Hatano, Chiryu; Tadaichi Matsumoto, Okazaki; Kazutaka Tamura, Toyota, all of Japan

[73] Assignee: Aisin Seiki Kabushiki Kaisha, Kariya, Japan

[21] Appl. No.: 396,723

[22] Filed: Mar. 1, 1995

[30] Foreign Application Priority Data

Mar. 11, 1994 [JP] Japan ................................. 6-041061

[51] Int. Cl.$^6$ .................................................... B62D 6/00
[52] U.S. Cl. ......................... 364/424.05; 364/426.02; 180/79.1; 180/140; 180/142; 280/91
[58] Field of Search ............... 364/424.05, 426.02, 364/426.03, 426.04; 180/140, 141, 142, 79.1; 280/91; 318/701

[56] References Cited

U.S. PATENT DOCUMENTS

| | | | |
|---|---|---|---|
| 4,690,431 | 9/1987 | Ito et al. | 280/771 |
| 4,733,878 | 3/1988 | Kanazawa et al. | 280/91 |
| 4,767,588 | 8/1988 | Ito | 364/424.05 |
| 4,782,907 | 11/1988 | Morishita et al. | 180/140 |
| 4,834,204 | 5/1989 | Ito et al. | 180/140 |
| 4,972,133 | 11/1990 | Hirota et al. | 318/646 |
| 5,048,633 | 9/1991 | Takehara et al. | 180/197 |
| 5,184,298 | 2/1993 | Imaseki et al. | 364/424.05 |
| 5,238,077 | 8/1993 | Vaughn et al. | 180/140 |
| 5,388,658 | 2/1995 | Ando et al. | 180/197 |

FOREIGN PATENT DOCUMENTS 523990  11/1987  Japan.

*Primary Examiner*—Kevin J. Teska
*Assistant Examiner*—Tan Nguyen
*Attorney, Agent, or Firm*—Sughrue, Mion, Zinn, Macpeak & Seas

[57] ABSTRACT

The amount of wiring required in a steering control system is reduced, and a power loss which occurs in the wiring of the power system is also reduced. The influences of electric noises upon the wiring between sensors and a control unit is reduced, thus improving the reliability. The control unit 9 connected with sensors and a servo unit SVU each include an independent computer 1, 8, and are connected to each other through a communication line. The control unit 9 is disposed adjacent to the sensors, while the servo unit SVU is disposed adjacent to an actuator. Information relating to a target steer angle and which is transmitted is chosen to be a variance TΔ thereof, and on the receiving end, TΔ is accumulated to obtain a target steer angle Tθ. A steer angle deviation θe is transmitted from SVU to the control unit 9. The presence or absence of any abnormality occurring is examined by checking the period of signal reception and signal values.

9 Claims, 9 Drawing Sheets

STEERING CONTROL SYSTEM FOR VEHICLE

FIELD OF THE INVENTION

The invention relates to a steering control system which may be utilized in an automobile.

BACKGROUND OF THE INVENTION

As disclosed in Japanese Patent Publication No. 23,990/1993, rear wheels of an automobile may be steered by means of an actuator such as by including an electric motor which operates in association with a steering input applied to front wheels.

A steering control system of the kind described comprises, for example, a bank of various sensors such as front wheel steer angle sensor, vehicle speed sensor, rear wheel steer angle sensor, motor speed sensor or the like; an actuator such as may be constituted by a combination of an electric motor and gear or gears; and an electronic control unit including a microcomputer and drivers for controlling the energization of the motor.

With a steering control system for rear wheels, it is necessary that a current of a relatively high magnitude be fed to the electric motor of the actuator, and thus it is necessary to use thick wires and of reduced lengths to provide a connection between the electronic control unit and the actuator since otherwise significant power loss occurs. Accordingly, it is desirable that the electronic control unit be positioned adjacent to the actuator.

However, the electronic control unit must be connected with a number of sensors such as yaw rate sensor, front wheel steer angle sensor, wheel speed sensor, T/M (transmission) vehicle speed sensor or the like which are disposed at locations spaced from the rear wheels. The positioning of the electronic control unit adjacent to the rear wheels results in that the wiring which is used to provide a connection between the number of sensors and the electronic control unit must be extended over increased distances, causing an increase in the quantity of wiring used and the likelihood that signals which are fed from the sensors to the electronic control unit be susceptible to the influences of electric noises.

SUMMARY OF THE INVENTION

Accordingly, it is a task of the invention to facilitate a connection between an electronic control unit and an actuator while reducing the quantity of wiring required in a steering control system and to improve the reliability against electric noises while reducing the power loss.

To solve the above task, the present invention provides a steering control system for vehicle comprising sensor means (17, 20, 22, 23, 24) for detecting information relating to the condition of a vehicle; first control means (9) including a first digital processor (1) and connected to the sensor means for producing information representing a target steer angle on the basis of information supplied from the sensor means; drive means (12) for adjusting a steer angle; and second control means (SVU) including a second digital processor (8) which is separate and independent from the first digital processor for controlling the drive means on the basis of information representing the target steer angle which is output from the first control means.

In a preferred embodiment of the invention, the first control means (9) includes first steer angle calculation means (S16) for repeatedly calculating a first target steer angle at a given period, steer angle information save means (S15) for saving the calculated first target steer angle at least during one period, steer angle variance calculation means (S18) for calculating a difference between a latest first target steer angle and the first target steer angle which was calculated one period before, and steer angle transmit means (S19) for transmitting the difference (TΔ) thus calculated to the second control means. Also, the second control means (SVU) includes second steer angle calculation means (S2A) for accumulating steer angle information (TΔ) which is input from the first control means at a given period to produce a second target steer angle (Tθ), and energization control means (S2C) for adjusting the energization of the drive means on the basis of the second target steer angle thus formed and an actual steer angle (RAGL) of a steering apparatus being controlled.

In a more preferred embodiment of the invention, the second control means (SVU) includes steer angle error calculation means (S2D) for calculating a steer angle error as a difference between the second target steer angle and the actual steer angle of the steering apparatus being controlled, and steer angle error transmit means (S2E) for transmitting the steer angle error to the first control means at the given period. The first control means (9) includes abnormality identifying means (S1C, S1E) for identifying the occurrence or not of any abnormality by reference to the steer angle error (θe) which is input from the second control means.

Also, in a preferred embodiment of the invention, the second control means (SVC) includes first communication abnormality detecting means (S28, S2F) for monitoring the period with which a signal is fed from the first control means and for detecting an abnormality occurring in the first control means whenever the period deviates from a predetermined range.

Also, in a preferred embodiment of the invention, the first control means (9) includes second communication abnormality detecting means (S1B, S1D) for monitoring the period at which a signal is fed from the second control means and for detecting an abnormality occurring in the second control means whenever the period deviates from a predetermined range.

It is to be understood that reference numerals and characters appearing in the above parentheses refer reference numerals and characters used to designate corresponding elements shown in an embodiment to be described later, but it should be understood that parts and components used to construct the invention are not limited to the specific elements shown in the embodiment.

In accordance with the invention, sensor means (17, 20, 22, 23, 24) is connected to an input of first control means (9), and drive means (12) is connected to the output of second control means (SVU). Information representing a target steer angle which is formed by the first control means is input to the second control means, which then operates to control the drive means on the basis of entered information representing the target steer angle. The first control means includes a first digital processor (1) while the second control means includes a second digital processor (8) which is separate and independent from the first digital processor. Each of the first and the second digital processor may comprise a software which is programmed in a general purpose control means such as a microcomputer, or may comprise a devoted hardware circuit which is designed to execute specified processing functions.

In accordance with the invention, the first and the second control means are independent from each other, and may be disposed at separate locations. Specifically, the first control means which is connected to sensor means may be located adjacent to the location of the sensor means (for example, in the forward portion of the compartment) while the second control means connected to the drive means may be located adjacent to the drive means (for example, in the same housing as a rear wheel steering mechanism). Disposing the first control means adjacent to the sensor means facilitates a connection therebetween while simultaneously minimizing the influence of electric noises upon such connection. Similarly, disposing the second control means adjacent to the drive means facilitates a connection therebetween while simultaneously minimizing the power loss which results from such connection.

The connection between the first and the second control means is greatly facilitated because the wiring to be provided therebetween only needs to feed a target steer angle information from the second to the first control means. If the wiring has an increased length, the impedance of the wiring may be reduced to minimize the influence of electric noises thereon. Since no high current flow is involved, there is no problem of an increased power loss.

In a preferred embodiment of the invention, the first steer angle calculation means (S16) in the first control means (9) repeatedly calculates a first target steer angle at a given period (which may be 5 msec, for example), and the steer angle variance calculation means (S18) calculates a difference (TΔ) between the latest first target steer angle and the first target steer angle which was calculated one period before, and such difference is fed to the second control means by the steer angle transmit means (S19). The second steer angle calculation means (S2A) in the second control means (SVU) accumulates steer angle information (TΔ) which is input from the first control means to produce a second target steer angle (Tθ), and the energization control means (S2C) adjust the energization of the drive means on the basis of the second target steer angle and the actual steer angle (RAGL) of the steering apparatus being controlled.

As a consequence, since information which is transmitted from the first to the second control means is limited to a variance in the first target steer angle which occurs per a given time interval, the information which must be transmitted per unit time is reduced, with consequence that the signal frequency may be reduced. When a high frequency signal is being transmitted, such signal generates high frequency noises to present various problems. However, when the signal frequency is reduced, the resulting high frequency noises will be drastically reduced. If the signal is fed in the form of parallel data, a reduction in the information being transmitted results in a corresponding reduction in the number of bits representing the signal being transmitted in parallel, thus allowing the number of wirings to be reduced.

The fact that the information which is transmitted from the first to the second control means is limited to a variance in the first target steer angle which occurs per given time interval results in an advantage that a maximum value of such information is normally substantially small as compared with the magnitude of a maximum value of the first target steer angle. Accordingly, by comparing information (TΔ) received by the second control means against a relatively small threshold (Tref), it is a simple matter to distinguish whether or not the information (TΔ) is or is not abnormal. For example, if a transmission error occurs in the information as a result of the influences of the electric noises, it is possible that a target value of the steer angle may rapidly change, causing an instability in the direction in which the vehicle is to proceed. However, when the maximum value of the information (TΔ) being transmitted is limited to a small value, a rapid change in the target value of the steer angle cannot occur as a result of a malfunctioning, thus enhancing the reliability in maintaining the stability of the direction in which the vehicle proceeds.

In a more preferred embodiment of the invention, the steer angle error calculation means (S2D) in the second control means (SVU) calculates a difference between the second target steer angle and the actual steer angle of a steering apparatus being controlled as a steer angle error, which is transmitted to the first control means by the steer angle error transmit means (S2E) at a given period (which may be 5 msec, for example). Abnormality identifying means (S1C, S1E) in the first control means identifies the occurrence or not of any abnormality by reference to the steer angle error (θe) which is inputted. Accordingly, in the event any abnormality occurs in the second control means or drive means, the occurrence of such abnormality can be detected by the first control means, thus enabling a malfunctioning to be prevented from occurring.

Also in a preferred embodiment of the invention, the first communication abnormality detecting means (S28, S2F) in the second control means (SVC) monitors the period at which a signal is transmitted from the first control means, and in the event the period deviates from a predetermined range, it regards that an abnormality occurred in the first control means. The period at which a signal is fed from the first control means normally remains substantially constant, and accordingly, if a large variation occurs in the period, it follows that some abnormality has occurred in the first control means. In this manner, the second control means is capable of detecting an abnormality occurring in the first control means.

Also in a preferred embodiment of the invention, the second communication abnormality detecting means (S1B, S1D) in the first control means (9) monitors the period at which a signal is fed from the second control means, and in the event the period deviates from a predetermined range, it regards this as the occurrence of an abnormality in the second control means. Since the period at which a signal is fed from the second control means normally remains substantially constant, if a large variation occurs in the period, it follows that a decision may be rendered that an abnormality occurred in the second control means. In this manner, the first control means is capable of detecting an abnormality occurring in the second control means.

Above and other objects and features of the invention will become apparent from the following description of an embodiment thereof with reference to the drawings.

DETAILED DESCRIPTION OF PREFERRED EMBODIMENT

Figure 1:
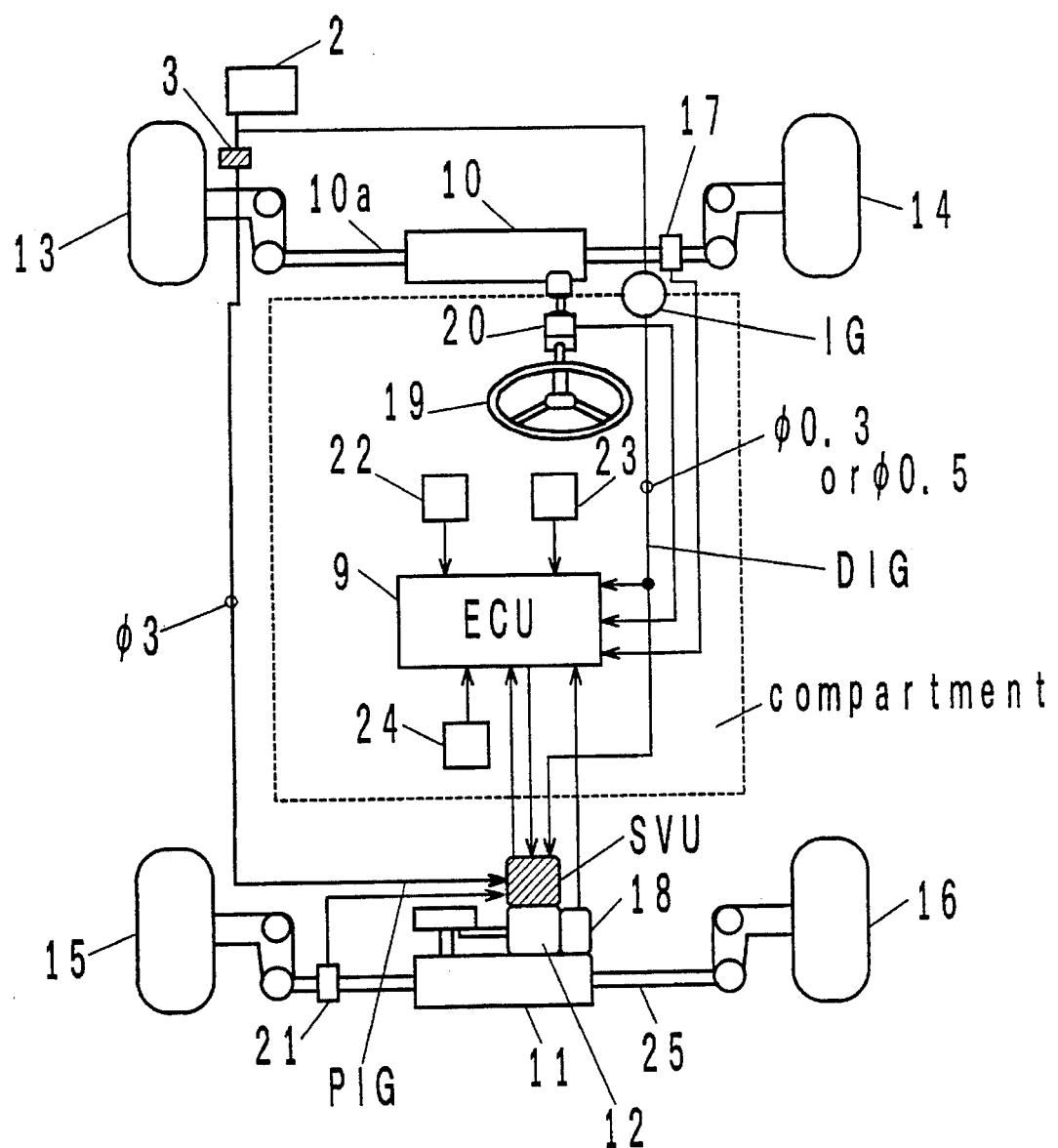
FIG. 1 is a block diagram of a steering system of an automobile to which the invention is applied.

FIG. 1 shows the arrangement of one type of steering system for an automobile to which the invention is applied. In FIG. 1, a left front wheel 13, a right front wheel 14, a left rear wheel 15 and a right rear wheel 16 are illustrated. A steering wheel 19 includes a steering shaft which is connected to a front wheel steering mechanism 10. The front wheel steering mechanism 10 internally houses a rack and pinion mechanism, and as the pinion rotates in response to a turning of the steering wheel 19, a rack shaft 10a having a rack formed thereon which meshes with the pinion is translated in the axial direction or to the left or right, as viewed in the drawing. As the rack shaft 10a is translated, a steer angle of the front wheels 13 and 14 which are connected thereto is changed.

In the present embodiment, two kinds of steer angle detectors 17 and 20 are provided in order to detect a steer angle of a front wheel. The steer angle detector 17 comprises a potentiometer which detects the axial position of the rack shaft 10a while the steer angle detector 20 comprises a rotary encoder which emits pulses in accordance with a turning motion of the steering shaft of the steering wheel 19. Signals delivered by the steer angle detectors 17 and 20 are input to an electronic control unit 9 which is disposed within the compartment of the automobile.

Also, two kinds of vehicle speed detectors 22 and 23 are provided in order to detect a vehicle speed. The vehicle speed detector 22 detects a vehicle speed in terms of an actual rotational speed of the wheel while the vehicle speed detector 23 detects a vehicle speed on the basis of the rotational speed of an output shaft of a transmission. Yaw rate detector 24 is provided in order to detect a yaw rate of a car body. Signals delivered by the vehicle speed detectors 22, 23 and the yaw rate detector 24 are also input to the electronic control unit 9.

Rear wheels 15 and 16 are connected to a rack shaft 25, and as the rack shaft 25 is translated axially or to the left or right, as viewed in the drawing, the steer angle of the rear wheels 15, 16 is changed. The rack shaft 25 is connected to a rear wheel steering mechanism 11, which internally houses a driving electric motor (brushless motor) 12, a magnetic pole sensor 18 which detects the rotational position of the motor 12, a servo unit SVU and a reduction gearing, not shown. The servo unit SVU drives the motor 12 on the basis of information representing a target steer angle which is input from the electronic control unit 9. As the motor 12 is driven, such drive is transmitted through the reduction gearing to cause a translation of the rack shaft 25 which is connected thereto, thus changing the steer angle of the rear wheels. A steer angle detector 21 is mounted on the rack shaft 25 for detecting the steer angle of the rear wheels. In the example, the detector 21 comprises a potentiometer. A signal delivered by the detector 21 is input to the servo unit SVU.

A first power supply line DIG connected to a battery 2 through an ignition switch IG is connected to both the electronic control unit 9 and the servo unit SVU. Because the current flow required is relatively low, an electric wire having a diameter of 0.3 mm (or 0.5 mm) is used to provide a wiring for the first power supply line DIG. On the other hand, a second power supply line PIG also connected to the battery 2 through a relay 3 is also connected to the servo unit SVU, but employs an electric wire having a diameter of 3 mm for its wiring because the current flow used is much higher.

Figure 2:
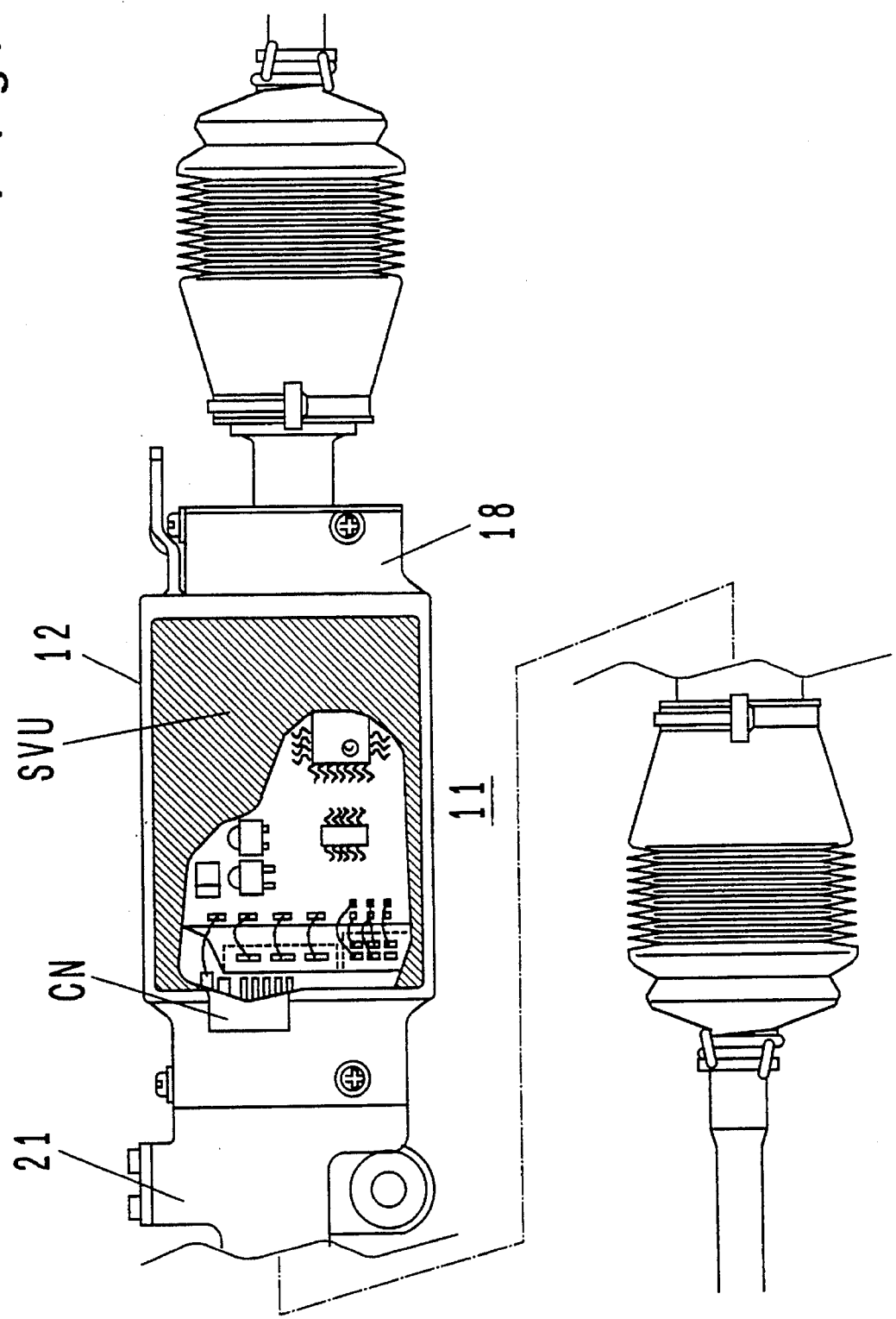
FIG. 2 is a plan view, partly removed, illustrating the appearance of a rear wheel steering mechanism 11 shown in FIG. 1.

The actual construction of the rear wheel steering mechanism 11 shown in FIG. 1 is illustrated in FIG. 2. Referring to FIG. 2, the servo unit SVU, the motor 12, the magnetic pole sensor 18 and the steer angle detector 21 are housed within a common housing of the rear wheel steering mechanism 11. The servo unit SVU is connected through a connector CN to the power supply lines PIG and DIG and the electronic control unit 9. The servo unit SVU and the motor 12 are connected together by short wires within the housing.

As a result of such construction, the number of wirings required to connect the rear wheel steering mechanism 11 with the power supply lines and the electronic control unit 9 is substantially reduced. In particular, a high current capacity wiring is required only for the power supply line PIG and the electric ground, thus allowing the power loss to be minimized. Since the servo unit SVU and the motor 12 are connected together by short wires within the housing, no substantial power loss is involved in this area.

On the other hand, the electronic control unit 9 is spaced from the rear wheel steering mechanism 11, but is located relatively adjacent to various sensors (17, 22, 23, 24), and accordingly, the electric wires which are used to connect these sensors to the electronic control unit 9 have reduced lengths, facilitating their disposition. It is necessary that a stabilized voltage be supplied to each sensor, and this requires that at least three wires be used per sensor for connection with the electronic control unit 9, meaning that a reduced length of these wires results in an advantage. In addition, the reduced length of the wires makes them less susceptible to the influences of external electric noises. While the connection between the electronic control unit 9 and the servo unit SVU will be described later, it will be seen that because the number of wires used is reduced, if an increased length of wiring is required for such connection, it is a simple matter to eliminate the influence of external noises. By way of example, the impedance of a signal line may be reduced to reduce such influence.

Figure 3:
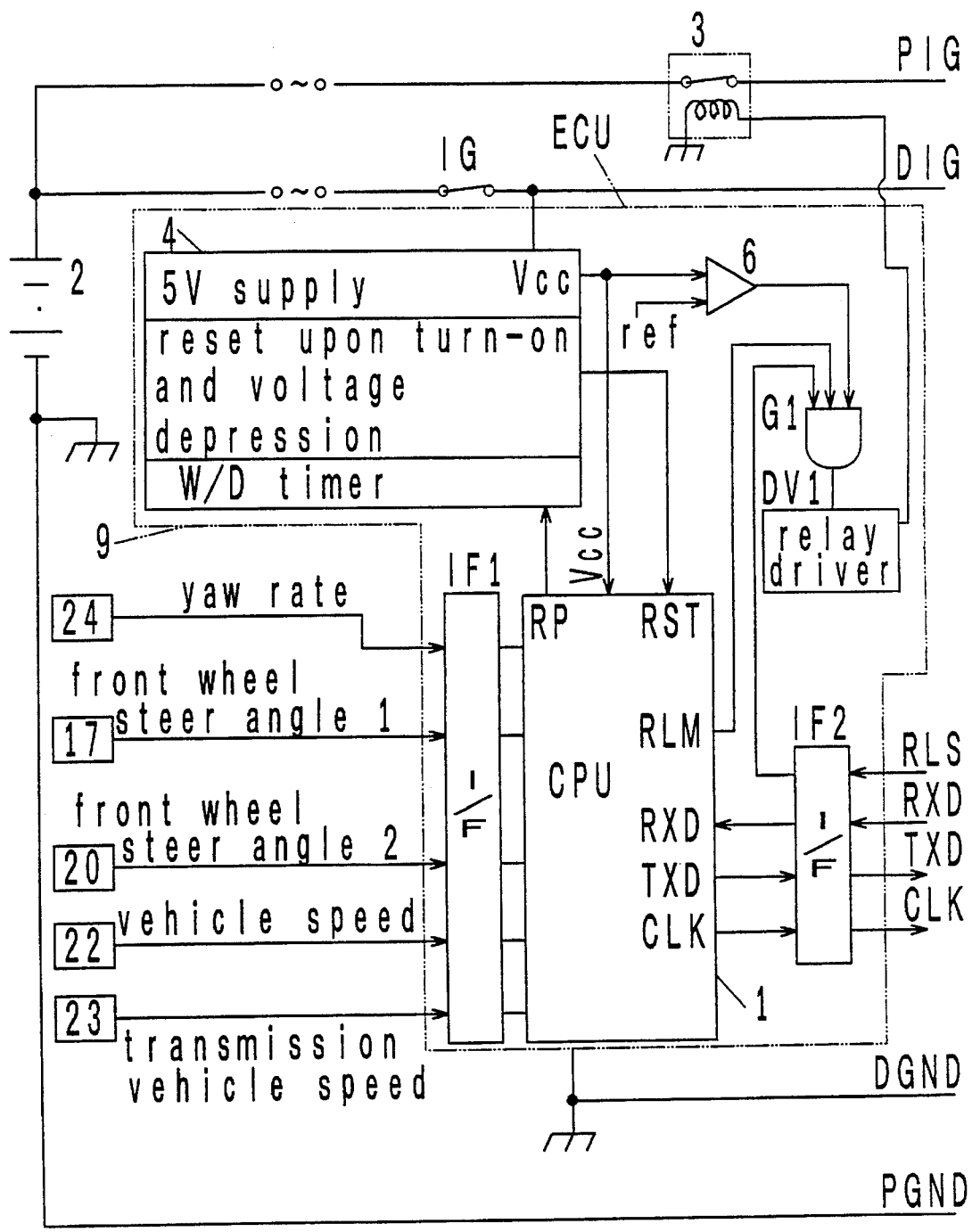
FIG. 3 is a block diagram of an electronic control unit 9 shown in FIG. 1.
Figure 4:
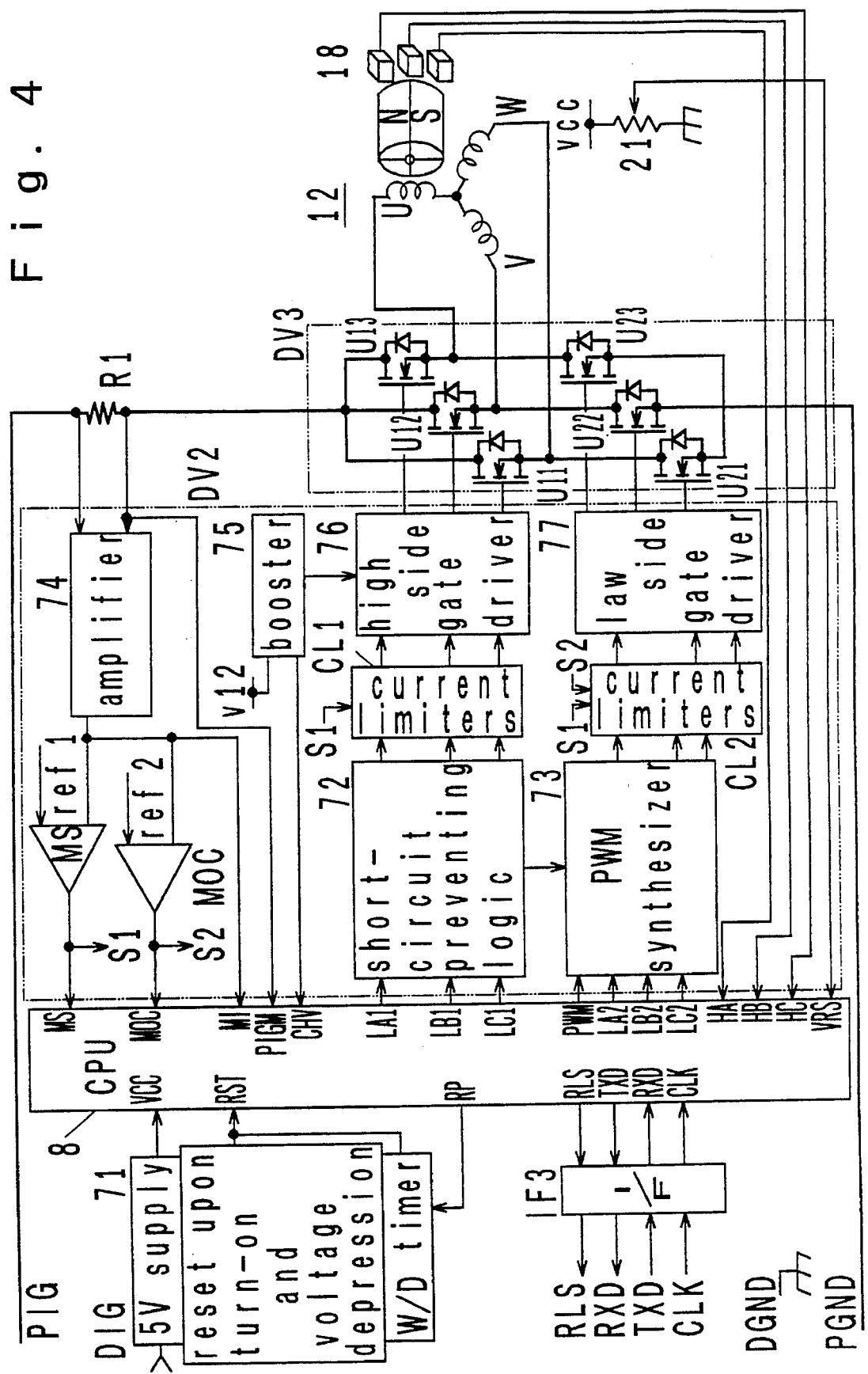
FIG. 4 is a block diagram of a servo unit SVU shown in FIG. 1.

FIG. 3 shows the arrangement of the electronic control unit 9 shown in FIG. 1, and the arrangement of the servo unit SVU is shown in FIG. 4. Initially referring to FIG. 3, the electronic control unit 9 contains a microcomputer 1, a power supply unit 4, a voltage monitor circuit 6, AND gate G1, a driver DV1, and interfaces IF1 and IF2. The microcomputer 1 includes an A/D converter, a timer and a serial communication circuit. The power supply unit 4 includes a stabilized power supply delivering a stabilized voltage of 5 V, a reset circuit which produces a reset signal upon turn-on and upon depression of the supply voltage, and watchdog timer circuit which detects an abnormality. The interfaces IF1 and IF2 are effective to provide a waveform shaping, amplification and level adjustment of signals.

Signals representing the yaw rate, the front wheel steer angle 1, the front wheel steer angle 2, wheel speed and transmission vehicle speed are input from the sensors 24, 17, 20, 22 and 23, respectively, to the input ports of the microcomputer 1 through the interface IF1. Signals representing the yaw rate and the front wheel steer angle 1 are analog voltages, which are periodically sampled by the A/D converter within the microcomputer 1 and converted into digital values to be saved in a memory. The front wheel steer angle 2, the wheel speed and transmission vehicle speed are each produced in terms of a pulse signal, the pulse period of which is respectively determined by the timer contained within the microcomputer 1 at a given period to provide a result of measurement, which, as converted into a steer angle or vehicle speed, is saved in a memory.

Four signal lines RLS, RXD, TXD and CLK provide a connection between the electronic control unit 9 and the servo unit SVC. Of these, the signal lines RXD, TXD and CLK are connected through the interface IF2 to the serial communication circuit of the microcomputer 1. The signal line RXD conveys a binary signal (serial data) which is transmitted from the servo unit SVC to the microcomputer 1, the signal line TXD conveys a binary signal (serial data) which is transmitted from the microcomputer 1 to the servo unit SVC, and the signal line CLK conveys a clock pulse which determines the timing of communication data.

The signal line RLS conveys a power supply interrupt signal which is delivered from the servo unit SVC. In the present example, in the event the voltage monitor circuit 6 detects an abnormally low supply voltage, in the event the microcomputer 1 delivers a power supply interrupt signal at its output port RLM or in the event the servo unit SVC delivers a power supply interrupt signal at its signal line RLS, the occurrence of one of these is detected by AND gate G1, whereupon the relay 3 interrupts the power supply to the supply line PIG.

Referring to FIG. 4, the servo unit SVU will be described. In this example, the servo unit SVU includes a microcomputer 8, a power supply unit 71, an interface IF3, resistor R1 and drivers DV2 and DV3. The microcomputer 8 contains an A/D converter, a timer and a serial communication circuit. The power supply unit 71 includes a stabilized power supply delivering a stabilized voltage of 5 V, a reset circuit which delivers a reset signal upon turn-on and upon occurrence of a reduction in the supply voltage, and a watchdog timer circuit which detects an abnormality. The interface IF3 is effective to perform a waveform shaping, amplification and level adjustment of signals.

As mentioned previously, four signal lines RLS, RXD, TXD and CLK provide a connection between the electronic control unit 9 and the servo unit SVC. Of these, the signal lines RXD, TXD and CLK are connected through the interface IF3 to the serial communication circuit of the microcomputer 8 while the signal line RLS is connected to the output port RLS of the microcomputer 8. The microcomputer 8 receives the binary signal (serial data) appearing on the signal line TXD and delivers a binary signal on the signal line RXD. The timing of the transfer of these signals is determined by the signal on the signal line CLK.

The driver DV2 comprises an amplifier 74, current level detector MS, MOC, a booster 75, a logic circuit 72, PWM synthesizing circuit 73, current limiters CL1, CL2, and gate drivers 76, 77. The driver DV3 comprises six sets of switching units U11, U12, U13, U21, U22 and U23, each including a switching element (power MOS FET) and a protective diode. The terminals of three phase coils U, V and W, which are connected in a star connection, of the motor 12 are connected across the output of the driver.

Resistor R1 produces a voltage which is proportional to a current flow through the driver DV3, and the resulting voltage level is amplified by the amplifier 74. The current level detectors MS and MOC compare an output voltage from the amplifier 74 against threshold values ref1 and ref2, respectively, examining if the current is excessively high. Signals S1 and S2 which are output from the current level detectors MS and MOC are input to the microcomputer 8 and the current limiters CL1, CL2.

To drive the motor 12, it is necessary that a current be passed across either one of pairs of terminals U→V, V→W, W→U, V→U, W→V, U→W, and that the pair of terminals across which the current is passed be sequentially switched. By turning on one pair from the six sets of switching units U11, U12, U13, U21, U22 and U23, a current flow is established across selected terminals of the motor 12. However, it should be noted that if the transistors in the pair of switching units U11 and U21, U12 and U22, and U13 and U23 are turned on simultaneously, the power supply line PIG will be shortened to PGND, and such occurrence must be avoided.

Normally, to establish a current flow across selected terminals of the motor 12, the microcomputer 8 delivers suitable signals at its output ports LA1, LB1, LC1, LA2, LB2, LC2, thus avoiding an electrical short-circuit from occurring across the power supply lines PIG—PGND. However, the logic circuit 72 identifies a combination of the input signals, and prevents the transistors in the pairs of switching units U11 and U21, U12 and U22 and U13 and U23 from being simultaneously turned on if an abnormality occurs in the operation of the microcomputer 8.

A drive torque generated by the motor 12 is regulated by a PWM (pulse width modulation) control of the current which is passed through the coil. The PWM signal determines the pulse current width, and is delivered from an output port PWM of the microcomputer 8. The PWM synthesizing circuit 73 synthesizes the PWM signal which is delivered by the microcomputer 8 at its port PWM and the phase switching signal which is delivered at ports LA2, LB2 and LC2, thereby forming a binary signal which controls the turn-on/off of the lower bank of switching units U21, U22 and U23.

The phase switching signals which are delivered by the microcomputer 8 at the ports LA1, LB1 and LC1 are fed through the logic circuit 72, the current limiter CL1 and the gate driver 76 to be applied to the gate terminals of the switching units U11, U12 and U13, respectively, and the phase switching signals which are delivered by the microcomputer 8 at its ports LA2, LB2 and LC2 are fed through the PWM synthesizing circuit 73, the current limiter CL2 and the gate driver 77 to be applied to the gate terminals of the switching units U21, U22 and U23. Each of the switching units U11, U12, U13, U21, U22 and U23 is turned on or off in response to the high or low level of the binary signal which is applied to its gate terminal.

The motor 12 used in this embodiment is a brushless motor, including a rotor which is formed by a permanent magnet and a stator carrying an electric coil. Accordingly, in order to rotate the motor 12 in a desired manner, it is necessary that the pole position of the rotor be continuously detected so that the coil which is to be energized be switched in accordance with the pole position and the direction of rotation. In this embodiment, the motor 12 contains a magnetic pole sensor 18 which detects the position of pole or poles on the rotor of the motor 12. The magnetic pole sensor 18 detects three phase signals, which are applied to input ports HA, HB and HC, respectively, of the microcomputer 8. The microcomputer 8 then detects the position of a pole by referring to the signals applied to the input ports HA, HB and HC, and produces a phase switching signal on the basis of such detected position, which signal is delivered to selected ports LA1, LB1, LC1, LA2, LB2 and LC2.

The steer angle detector 21 which detects the steer angle of the rear wheels applies a voltage, which corresponds to the steer angle, to an input port VRS of the microcomputer 8. The microcomputer 8 periodically samples the level of the voltage applied to its input port VRS, and converts it into a corresponding digital value by means of its internally housed A/D converter, with a result of conversion saved in a memory. It is to be noted that in the present embodiment, the microcomputer 8 determines an actual steer angle of the rear wheels on the basis of an initial value of steer angle which is initially detected by the steer angle detector 21, and a variance in the steer angle which is obtained by counting an output signal from the magnetic pole sensor 18.

Figure 5:
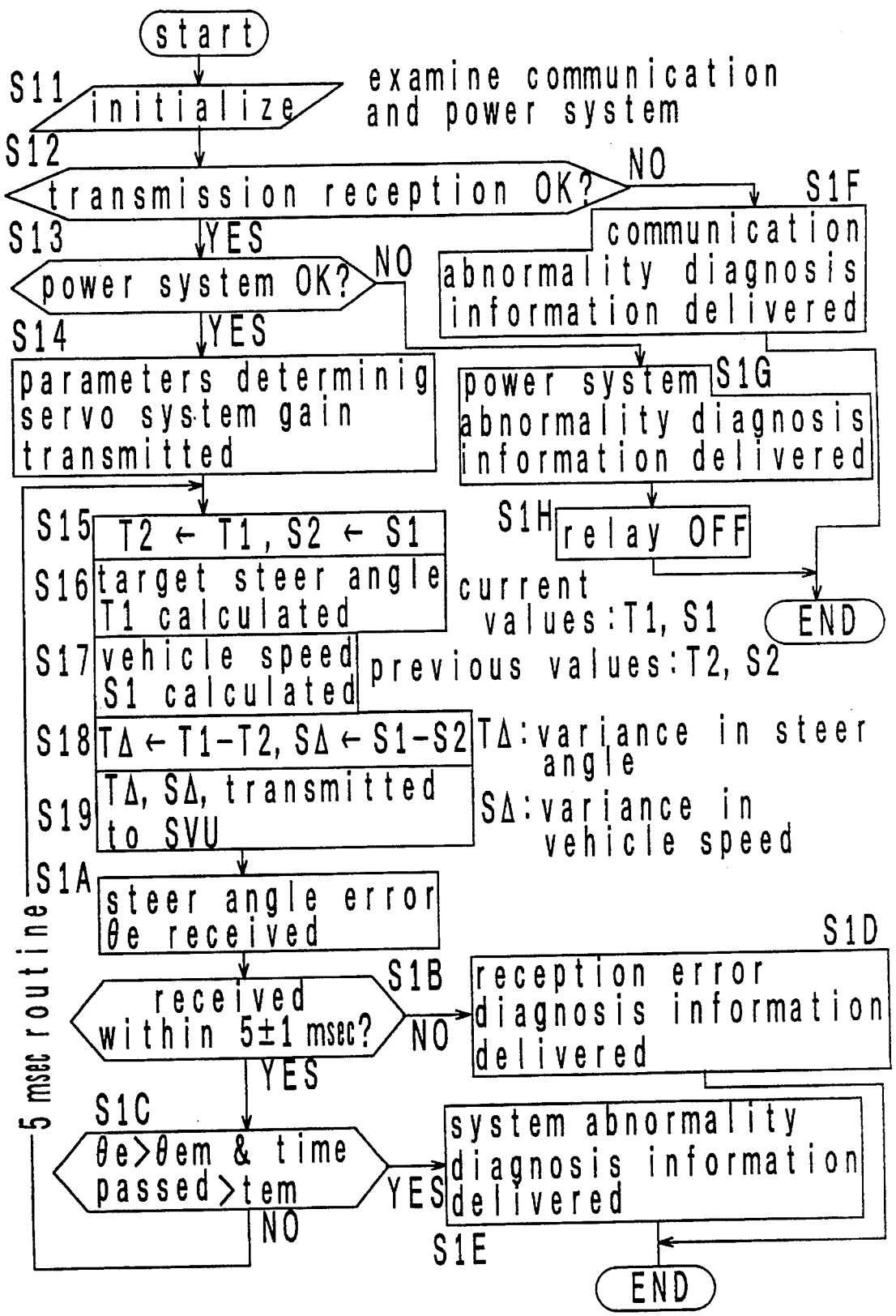
FIG. 5 is a flow chart illustrating the operation of a microcomputer 1 shown in FIG. 3.
Figure 6:
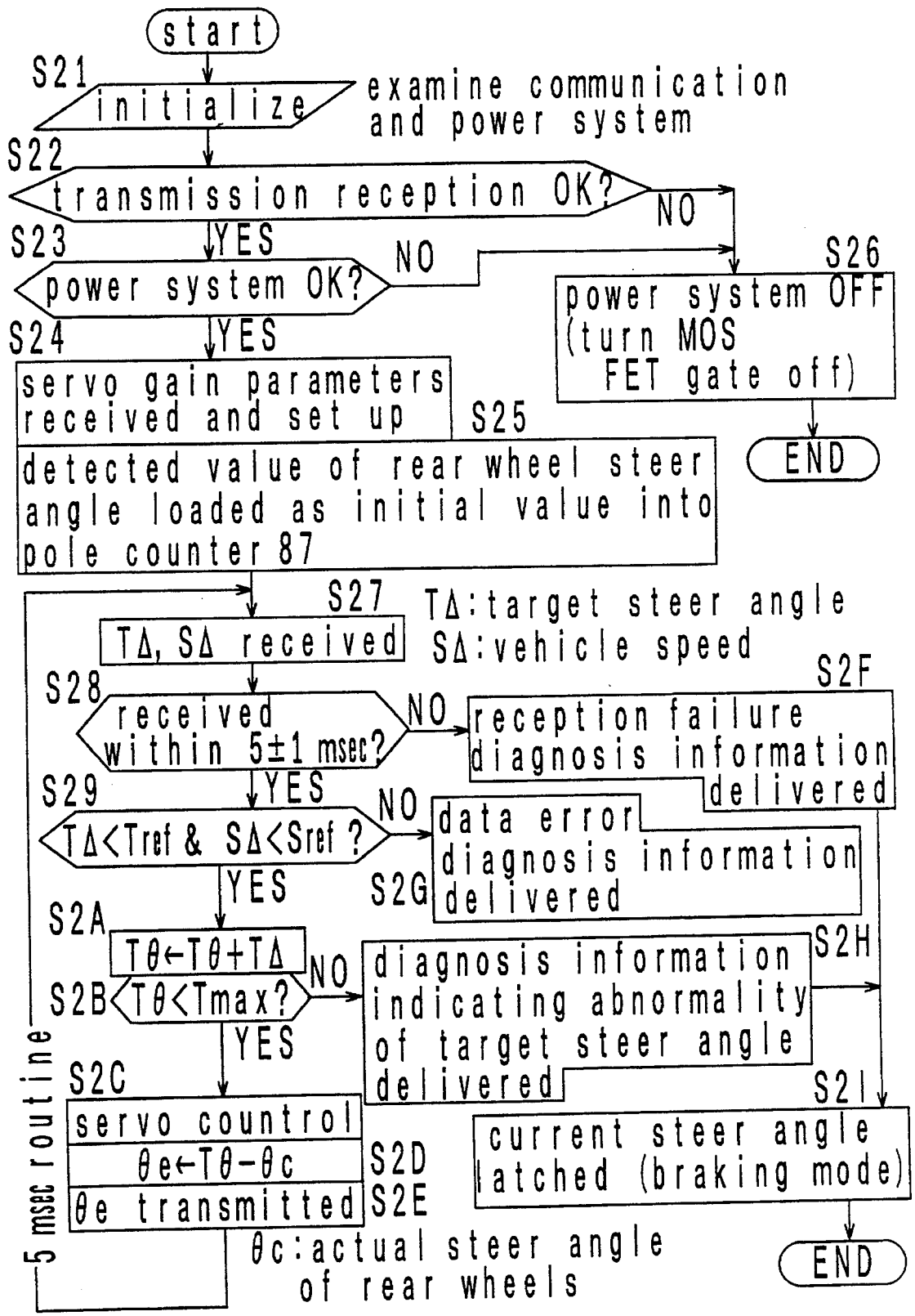
FIG. 6 is a flow chart illustrating the operation of a microcomputer 8 shown in FIG. 4.

The operation of the microcomputer 1 in the electronic control unit 9 shown in FIG. 3 is illustrated in FIG. 5, and the operation of the microcomputer 8 in the servo unit SVU shown in FIG. 4 is illustrated in FIG. 6. Referring to FIG. 5, the operation of the microcomputer 1 will be initially described.

When the power supply is turned on, an initialization is executed. Specifically, a check of CPU proper, a clearing of memories, initialization of parameters, and setting of various modes are executed. The signal lines RXD, TXD and CLK are utilized to perform a test transmission and reception of data between the microcomputer 1 and the servo unit SVC to see if there is any abnormality in the communication system. In addition, the presence or absence of any abnormality in the power system is examined, based on the content of transmission which is transmitted from the servo unit SVC to the electronic control unit 9.

When it is confirmed that the communication system is operating normally as is the power system, the program proceeds from step S12 to step S13 and thence to step S14. However, in the event any abnormality is found in the communication system, the program branches from step S12 to S1F. Alternatively, if an abnormality is found in the power system, the program branches from step S13 to step S1G. At step S1F, a diagnosis information indicating the presence of an abnormality in the communication system is saved in its own memory, and the diagnosis information is transmitted to the servo unit SVC, using the signal lines RXD, TXD and CLK. At step S1G, diagnosis information indicating the presence of an abnormality in the power system is saved in its own memory, and is also transmitted to the servo unit SVC, using the signal lines RXD, TXD and CLK. At the following step S1H, the signal level of the output port RLM is switched to its low level, thus turning the relay 3 off. This interrupts the power supply from the power system to the power supply line PIG.

At next step S14, parameters which determine the gain of a servo system is read from an internal memory (ROM) and is transmitted to the servo unit SVC, using the signal lines RXD, TXD and CLK.

The following steps S15—S16—S17—S18—S19—S1A—S1B—S1C—S15 . . . are repeatedly executed in a loop fashion until some abnormality occurs. This loop operation is executed periodically at a rate of once every 5 msec.

At step S15, the content of a register which holds a current value T1 of a target steer angle is saved in a register which holds a previous value T2, and the content of a register which holds a current value S1 of a vehicle speed is saved in a register which holds a previous value S2. At subsequent step S16, the current value T1 of the target steer angle is calculated and is stored in a given register, and at step S17, the current value S1 of the vehicle speed is calculated and stored in a given register. At step S18, a difference (a variance) TΔ between the current value T1 and the previous value T2 of the target steer angle is calculated and is stored in a given register, and also a difference (a variance) SΔ between the current value S1 and the previous value S2 of the vehicle speed is calculated and stored in a given register. At following step S19, information representing the variance in the target steer angle TΔ and the variance in the vehicle speed SΔ are transmitted to the servo unit SVC in the format of serial binary data. In this manner, the electronic control unit 9 transmits information representing such variances TΔ and SΔ to the servo unit SVC at a rate of once every 5 msec.

In the same manner as the electronic control unit 9, the servo unit SVC transmits information to the electronic control unit 9 at a rate of once every 5 msec. Information which is fed from the servo unit SVC to the electronic control unit 9 is a deviation θe between a target steer angle and an actual steer angle in the servo unit SVC. At step S1A, the microcomputer 1 receives the steer angle deviation θe which is transmitted from the servo unit SVC. At step S1B, it compares the time interval corresponding to one period which has passed between the previous and the current reception of information representing the steer angle deviation θe against a threshold value, thus determining if any abnormality has occurred. If the time interval of this period remains within a range of 5±1 msec or in a range from 4 to 6 msec, such period is considered normal, and the program proceeds from step S1B to step S1C. Otherwise, the program proceeds to step S1D.

At step S1D, diagnosis information indicating the occurrence of a reception error is saved in its own memory, and is also transmitted to the servo unit SVC, using the signal lines RXD, TXD and CLK. Normally, the execution of step S1D does not occur, but whenever a failure occurs in the communication circuit, information representing the steer angle deviation θe cannot be received within a time interval of 5±1 msec, whereupon the step S1D is entered to detect the occurrence of an error.

At subsequent step SIC, a value of the steer angle deviation θe which is received is compared against a predetermined threshold (upper limit) value θem. If θe>θem, a time counting operation is initiated, and the time which passes is compared against a predetermined threshold value tem. The program then normally proceeds from step S1C to step S15. However, if a condition under which the inequality θe>θem applies continues, the time which passes increases every time the execution of the step S1C occurs. If the inequality θe≦θem is satisfied, the time counting will be cleared, but as long as θe>θem continues, the time which has passed will exceed tem, whereupon the program proceeds from step S1C to S1E.

At step S1E, diagnosis information indicating the occurrence of an abnormality of the system is saved in its own memory, and is also transmitted to the servo unit SVC, using the signal lines RXD, TXD and CLK. The execution of the step S1E does not occur normally. However, whenever the motor 12 ceases to operate or a failure occurs with the magnetic pole sensor 18 or the steer angle detector 21 or the like, a difference between a target steer angle and an actual steer angle increases and does not return to zero, whereupon the step S1E is entered to detect the occurrence of an error.

Referring to FIG. 6, the operation of the microcomputer 8 in the servo unit SVC will now be described. Upon turn-on of the power supply, the microcomputer 8 executes an initialization at step S21, thus, checking CPU itself, clearing memories, initializing various parameters and setting various modes. It also utilizes the signal lines RXD, TXD and CLK to perform a communication test with the electronic control unit 9, examining if any abnormality is present within the communication system. In addition, the presence of any abnormality in the power system is also examined. Specifically, the microcomputer 8 sequentially switches the phase switching signals which are delivered to its output port LA1, LB1, LC1, LA2, LB2 and LC2 while sampling the levels of voltages which are applied to the ports MI and PIGM of the microcomputer 8, converting the analog sample values into digital values and comparing such values against predetermined threshold to determine the status of the relay 3, the status of the switching units U11, U12, U13, U21, U22 and U23 and the condition (open-circuit or short-circuit) of coils in the motor 12 to examine if there is any abnormality occurring therein.

If the presence of an abnormality in the communication system is found as a result of the examination which takes place at step S21, the program branches from step S22 to step S26. In the event an abnormality is found in the power system, the program branches from step S23 to step S26. At step S26, the phase switching signals delivered to the output ports LA1, LB1, LC1, LA2, LB2 and LC2 are controlled to turn all of the switching units U11 to U23 off and also to control the level on the signal line RLS to turn the relay 3 off.

In the absence of any abnormality, the program proceeds through steps S21—S22—S23 to step S24. At step S24, information representing the parameters which determine the gain of the servo system and which is transmitted from the electronic control unit 9 using the signal lines RXD, TXD and CLK is entered, thus setting the gain in the servo system (see FIG. 7) accordingly.

Figure 7:
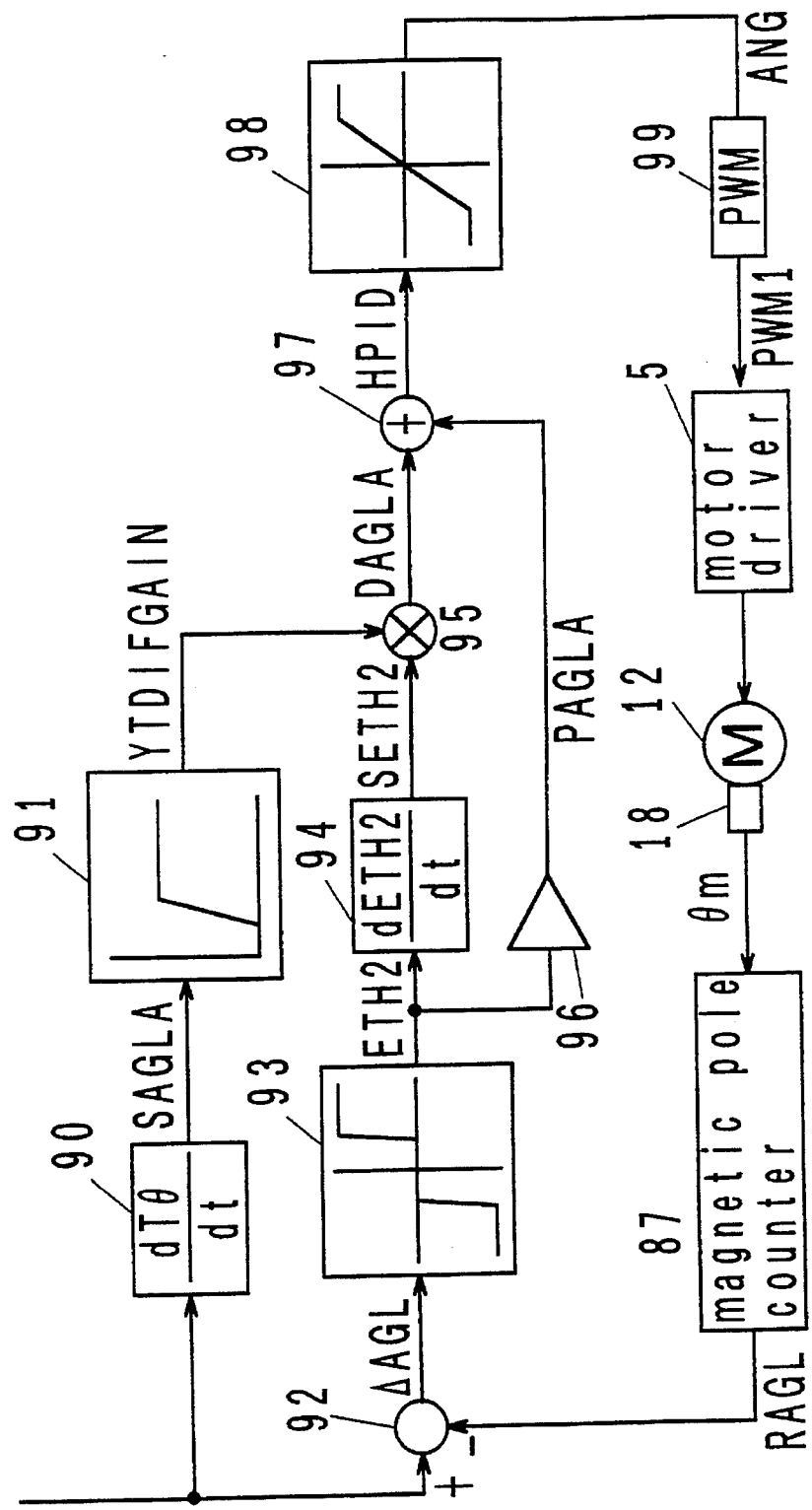
FIG. 7 is a block diagram of a servo system of an embodiment.

At following step S25, an actual steer angle for the rear wheels which is detected by the steer angle detector 21 is loaded as an initial value into a magnetic pole counter (see FIG. 7). The detected value by the steering angle detector 21 has a relatively low resolution, but steer angle information having a high resolution is obtained by counting pulses which are output from the magnetic pole sensor 18. However, it will be noted that steer angle information which is available from the magnetic pole sensor 18 only relates to a relative change, and accordingly the actual steer angle detected by the steer angle detector 21 is used as an initial value, and an actual steer angle of a high resolution which is obtained by a combination of the initial value and the variance in the steer angle is produced by the magnetic pole counter 87.

Subsequent steps S27, S28, S29, S2A, S2B, S2C, S2D, S2E, S27, . . . are executed repeatedly as a loop operation until some abnormality is detected. This loop operation takes place periodically at a rate of once per 5 msec.

At step S27, information representing variances TΔ and SΔ in the target steer angle and the vehicle speed which are transmitted from the electronic control unit 9 using the signal lines RXD, TXD and CLK are received and are stored in given registers. At step S28, the time which has passed for one period until the current information TΔ and SΔ are received since the last reception is examined to see if it lies in a range defined by a predetermined threshold (5±1 msec). If the time passed lies within a range from 4 to 6 msec, the program proceeds to step S29, but proceeds to step S2F otherwise.

At step S2F, diagnosis information indicating the occurrence of a reception failure is saved in a memory, and is also transmitted to the electronic control unit 9 using the signal lines RXD, TXD and CLK. At step S2I which follows, the motor 12 ceases to be driven (by braking) and the steering system for the rear wheels is maintained at its prevailing steer angle while suspending subsequent operation.

At step S29, information TΔ and SΔ which are received are compared against respective predetermined threshold values Tref and Sref. The threshold values Tref and Sref each represent an upper limit. If TΔ<Tref and SΔ<Sref, the program proceeds to next step S2A. However, if TΔ≧Tref or SΔ≧Sref, the occurrence of an error is recognized, and the program proceeds to step S2G.

In this embodiment, since it is impossible that there occurs a large variation in the target steer angle or vehicle speed in a moment (corresponding to 5 msec), it follows that information TΔ representing the steer angle which is received will be substantially small as compared with the maximum value of the target steer angle, and similarly information SΔ representing the vehicle speed will be substantially small as compared with the maximum value of the vehicle speed. This means that when received information TΔ or SΔ which represent either the steer angle or the vehicle speed has a certain magnitude, there is a high possibility that an error may have occurred in the data transmission. Tref which is used as a threshold value may be chosen to be substantially smaller than the maximum value of the target steer angle, and similarly the threshold Sref can be chosen substantially smaller than the maximum value of the vehicle speed. In this manner, in the event a data error occurred, such abnormality can be reliably detected before the target steer angle largely deviates from the value which it inherently should be.

At step S2G, diagnosis information indicating a data error is saved in a memory, and is also transmitted to the electronic control unit 9 using the signal lines RXD, TXD and CLK. At next step S2I, the motor 12 ceases to be driven (by braking), and the steering system for the rear wheels is maintained at its prevailing steer angle while suspending subsequent operation.

At step S2A, latest steer angle information TΔ which is received is added to the target steer angle Tθ which is stored within the servo unit SVC to update the target steer angle Tθ, which is then saved in a given register.

At step S2B, the updated target steer angle Tθ is compared against the threshold value (upper limit) Tmax. If Tθ<Tmax, the program proceeds to next step S2C, and proceeds to step S2H otherwise. At step S2H, diagnosis information indicating an abnormality occurring in the target steer angle is saved in a memory, and is also transmitted to the electronic control unit 9 using the signal lines RXD, TXD and CLK. At step S2I, the motor 12 ceases to be driven, and the steering system for the rear wheels is maintained at its prevailing steer angle while suspending subsequent operation.

At step S2C, a control over the servo system which drives the motor 12 is exercised. The arrangement of the servo system is shown in FIG. 7 and will be described later.

At subsequent step S2D, a difference between the latest target steer angle Tθ and the actual steer angle detected by the steer angle detector 21 is obtained as a deviation θe, which is saved in a register. At following step S2E, information representing the steer angle deviation θe is transmitted to the electronic control unit 9 using the signal lines RXD, TXD and CLK. RAGL which is calculated by the magnetic pole counter 87 shown in FIG. 7 may be used as an actual steer angle which is used at step S2D. In this instance, θe=ΔAGL.

Referring to FIG. 7, the servo system of the servo unit SVC will now be described. In actuality, except for the motor driver 5, the motor 12 and the magnetic pole sensor 18, the servo system is entirely implemented as a software within the microcomputer 8. The motor driver 5 shown in FIG. 7 corresponds to drivers DV2 and DV3 shown in FIG. 4. The gain of the control system is set up at step S24 shown in FIG. 6.

The target steer angle Tθ is input to a differentiator 90 and a subtractor 92. The differentiator 90 calculates a time derivative SAGLA of the target steer angle Tθ, and feeds it to a differentiation gain setting 91, which obtains a differentiation gain YTDIFGAIN from the absolute value of SAGLA. It is to be noted that graphic illustrations in each block such as the differentiation gain setting 91 indicates the relationship between an input and an output, the abscissa corresponding to the input and the ordinate corresponding to the output. In this example, the differentiation gain is set to 0 when the absolute value of the derivative SAGLA is equal to or less than 4°/sec, and is set to 4 when the absolute value of the derivative SAGLA is equal to or greater than 12°/sec. Otherwise, the gain assumes a value in a range from 0 to 4.

The subtractor 92 calculates a difference between the target steer angle Tθ and the actual steer angle RAGL or a deviation therebetween ΔAGL. The actual steer angle RAGL is delivered from the magnetic pole counter 87, which recognizes the direction of rotation of the motor 12 from a phase difference between three phase pulse signals delivered from the magnetic pole sensor 18, and detects the value of the steer angle by adding or subtracting the number of pulses in the pulse signal to or from the prevailing count. The steer angle value which is derived from the pulse signal of the magnetic pole sensor 18 represents a relative value (angle of rotation), but since the actual steer angle detected by the steer angle detector 21 initially or before the drive is initiated at step S25 shown in FIG. 6 is loaded into the magnetic pole counter 87, the value RAGL delivered from the magnetic pole counter 87 represents an actual steer angle.

The steer angle deviation ΔAGL is processed by a steer angle deviation dead zone creator 93, which produces a steer angle deviation ETH2. The steer angle deviation dead zone creator 93 provides a steer angle deviation ETH2 of 0 for an input (steer angle deviation ΔAGL) having an absolute value equal to or less than a given value E2PMAX, thus inhibiting the control for smaller values of the deviation ΔAGL. The deviation ETH2 delivered by the creator 93 is input to a proportionality unit 96 and another differentiator 94.

The proportionality unit 96 multiplies the steer angle deviation ETH2 by a predetermined proportionality gain to deliver a proportional control value PAGLA. The differentiator 94 provides a time differentiation of the deviation ETH2 to deliver a steer angle deviation derivative SETH2. A multiplier 95 multiplies the steer angle deviation derivative SETH2 by the differentiation gain YTDIFGAIN mentioned above to provide a differentiation control value DAGLA. An adder 97 adds the proportionality control value PAGLA and the differentiation control value DAGLA together to deliver a controlled steer angle value HPID as an output.

The controlled steer angle value HPID is passed through a steer angle deviation limiter 98 to provide a control variable ANG. The limiter 98 produces an output which is proportional to the input and limits the range of the output value so that the control value ANG does not exceed an upper limit of 1.5° or a lower limit of −1.5°. The control variable ANG is input to a pulse width modulator 99, where it is converted into a pulse width modulated signal PWM1. In this manner, a pulse signal PWM1 having a constant period and having a pulse width which is proportional to the magnitude of the control variable ANG is produced.

The pulse width modulated signal PWM1 is fed to the motor driver 5, which determines the timing of turn-on/off and hence the current flow through the motor 12 in accordance with the pulse width modulated signal PWM1. In this manner, the drive torque of the motor 12 varies with the pulse width modulated signal PWM1. Since the magnetic pole sensor 18 produces pulses as the motor 12 rotates, the count in the magnetic pole counter 87 or the actual steer angle RAGL changes, also changing the steer angle deviation ΔAGL. The servo system shown controls the motor 12 so as to bring the steer angle deviation ΔAGL close to 0.

Figure 8:
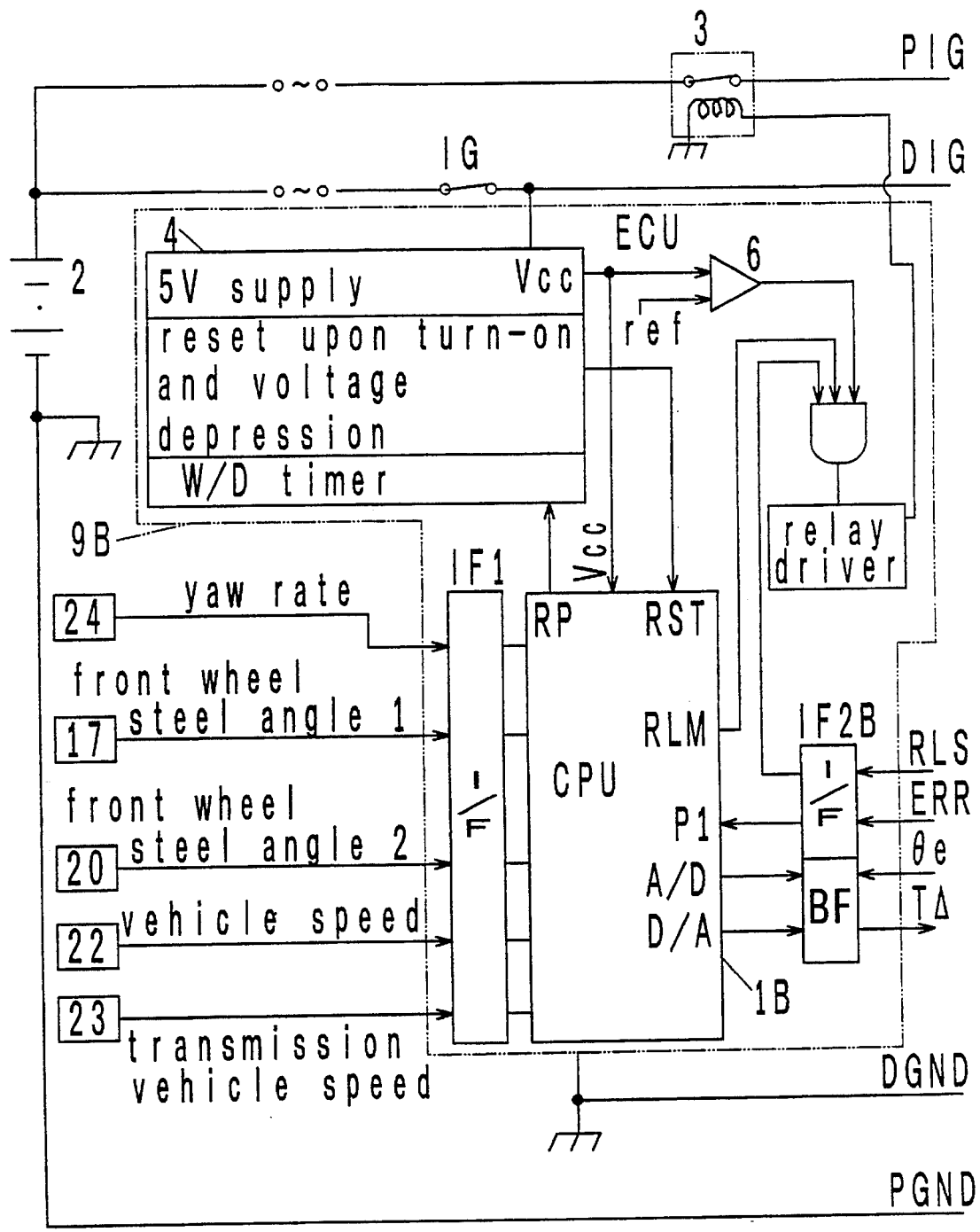
FIG. 8 is a block diagram of an electronic control unit of a modification.
Figure 9:
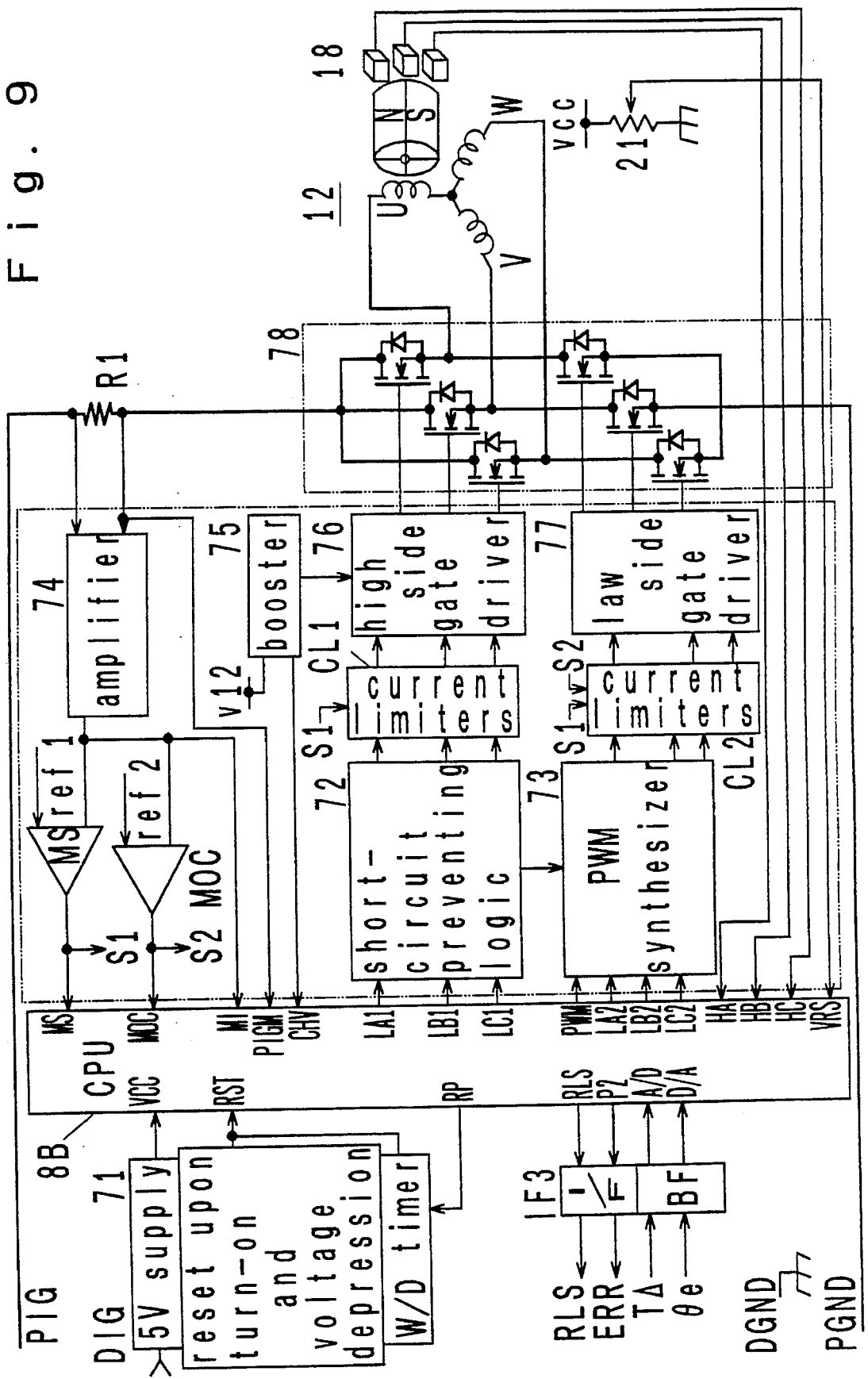
FIG. 9 is a block diagram of a servo unit SVU of the modification.

A modification of electronic control unit 9B is shown in FIG. 8, and a modification of servo unit SVU2 is shown in FIG. 9. As before, the electronic control unit 9B feeds a target steer angle information TΔ to a servo unit SVU2, which in turn feeds a steer angle deviation information θe to the electronic control unit 9B, but such information appears as analog voltages on signal lines TΔ and θe.

A microcomputer 1B in the electronic control unit 9B converts the target steer angle information TΔ into a corresponding analog voltage by means of a D/A converter, and delivers a corresponding output to port D/A. This signal passes through a buffer BF in an interface IF2B to appear on the signal line TΔ, and then passes through a buffer BF in an interface IF3B of the servo unit to be input to a port A/D of a microcomputer 8B. The voltage of this signal is converted into a digital value by an A/D converter contained within the microcomputer 8B to be processed in the similar manner as the steer angle information TΔ in the embodiment described above.

The microcomputer 8B converts the steer angle deviation information θe which is produced therein into an analog voltage signal which is delivered to port D/A. This signal passes through a buffer BF in an interface IF3B, through the signal line θe and through buffer BF in the interface IF2B to be input to port A/D of the microcomputer 1B. The microcomputer 1B converts the voltage of the signal which is input to the port A/D into a corresponding digital value by means of its internal A/D converter to produce steer angle deviation information θe, which is processed in the similar manner as mentioned previously.

In this embodiment, in the event the microcomputer 8B of the servo unit detects the occurrence of an abnormality, the level of a signal appearing at its port P2 is controlled to produce an error signal (binary signal) ERR, which is passed through the interfaces IF3B and IF2B to be input to the input port P1 of the microcomputer 1B. The microcomputer 1B makes a periodical reference to the status of the input port P1 to recognize the presence or absence of any abnormality within the servo unit.

As mentioned, in accordance with the invention, the first and the second control means are separate and independent from each other, and can be disposed at distinct locations. Specifically, the first control means connected to the sensor means may be located close to the location of the sensor means (for example, in the forward portion of the compartment) while the second control means connected to the drive means may be disposed close to the drive means (for example, in the same housing as the steering mechanism for the rear wheels). Disposing the first control means adjacent to the sensor means facilitates a connection therebetween, and makes such connection insusceptible to the influences of electric noises. Disposing the second control means close to the drive means facilitates a connection therebetween while reducing the power loss which may occur in the region of such connection.

It will also be seen that as to the wiring between the first and the second control means, the connection therebetween is greatly facilitated since it is only necessary basically that information representing the target steer angle be fed from the former to the latter. If such wiring has an increased length, the impedance of the wiring may be reduced to make it insusceptible to the influences of electric noises. Since there is no need to pass a high current, there is no problem involved with an increase in the power loss.

In the preferred embodiment, information which is fed from the first and the second control means is a variance in a first target steer angle which occurs per given time interval, whereby the amount of information which must be transmitted per unit time is reduced, with a consequence that the resulting signal frequency may be reduced. It will be appreciated that if a high frequency signal is transmitted, such signal will emit high frequency noises, causing various problems, but that by reducing the signal frequency, the generation of high frequency noises can be drastically reduced. If the signal is transmitted in the format of parallel data, a reduction in the amount of information transmitted results in a decrease in the number of bits which are fed in parallel, allowing a further reduction in the number of wirings used.

The fact that the information which is fed from the first to the second control means represents a variance in the first target steer angle which occurs per given time interval results in an advantageous effect that a maximum value of such information is substantially small as compared with a maximum value of the first target steer angle. This permits any abnormality in the information (TΔ) can be identified in a simple manner by comparing information (TΔ) received by the second control means against a threshold value (Tref) having a relatively low magnitude. If a transmission error occurs in the information as a result of influences of electric noises, for example, there will be a rapid change in the target value of the steering angle, which might cause an instability in the direction in which the vehicle is to proceed. However, when the maximum value of the information (TΔ) which is transmitted is limited to a small value, any rapid change in the target value of the steer angle which might result from a malfunctioning can be prevented, thus enhancing the reliability in maintaining the stability of the direction in which the vehicle is to proceed.

In the preferred embodiment, in the event some abnormality has occurred in the second control means, for example, in the drive means, the occurrence of such abnormality can be detected by the first control means, thus enabling a malfunctioning to be prevented from occurring. Similarly, the second control means is capable of detecting any abnormality occurring in the first control means in the same manner as the first control means is capable of detecting an abnormality in the second control means.

What is claimed is:

1. A steering control system for vehicle comprising:

sensor means for detecting information relating to the status of a vehicle;

first control means including a first digital processor and connected to the sensor means to produce information representing a target steer angle on the basis of information detected by the sensor means;

drive means for regulating a steer angle;

and second control means including a second digital processor which is separate and independent from the first digital processor and controlling the drive means on the basis of information representing a target steer angle which is delivered by the first control means.

2. A steering control system according to claim 1 in which the first control means includes a first steer angle calculation means for repeatedly calculating a first target steer angle at a given period, steer angle information save means for saving the calculated first target steer angle at least for one period, steer angle variance calculation means for calculating a difference between a latest first steer angle and the first target steer angle which was calculated one period before, and steer angle transmit means for transmitting the difference in the first target steer angles thus obtained to the second control means, and wherein the second control means includes second steer angle calculation means for accumulating steer angle information which is fed from the first control means at a given period to produce a second target steer angle, and energization control means for regulating the energization of the drive means on the basis of the second target steer angle thus produced and an actual steer angle of a steering system being controlled.

3. A steering control system according to claim 2 in which the second control means includes steer angle error calculation means for calculating a difference between the second target steer angle and the actual steer angle of the steering system being controlled as a steer angle error, and steer angle error transmit means for transmitting the steer angle error to the first control means at a given period, and wherein the first control means includes abnormality identifying means for identifying the presence or absence of any abnormality occurring by making reference to the steer angle error which is fed from the second control means.

4. A steering control system according to claim 1 in which the second control means includes first communication abnormality detecting means for monitoring the period at which a signal is fed from the first control means and for detecting the occurrence of an abnormality in the first control means whenever the period deviates from a predetermined range.

5. A steering control system according to claim 3 in which the first control means includes second communication abnormality detecting means for monitoring the period at which a signal is fed from the second control means and for detecting the occurrence of an abnormality in the second control means whenever the period deviates from a predetermined range.

6. A steering control system according to claim 1 in which the sensor means includes front wheel steer angle detecting means which detects the steer angle of front wheels of an automobile, and wherein the first control means produces information representing a target steer angle for rear wheels on the basis of the steer angle of the front wheels as detected by the front wheel steer angle detecting means.

7. A steering control system according to claim 1 in which the first and the second digital processor each include a serial data communication circuit, and the first and the second digital processor are connected together through a serial data communication line and a signal line which conveys a clock pulse.

8. A steering control system for vehicle comprising:

sensor means for detecting information relating to the status of a vehicle;

first control means including a first digital processor, and also including a first steer angle calculation means for repeatedly calculating a first target steer angle at a given period, steer angle information save means for saving the calculated first target steer angle at least for one period, steer angle variance calculation means for calculating a difference between a latest first target steer angle and the first target steer angle which was calculated one period before, and steer angle transmit means for transmitting the difference in the first target steer angles thus obtained to the second control means, the first control means being connected to the sensor means to produce information representing a target steer angle on the basis of information detected by the sensor means;

drive means for regulating a steer angle;

and second control means including a second digital processor which is separate and independent from the first digital processor, and also including second steer angle calculation means for accumulating steer angle information which is fed from the first control means at a given period to produce a second target steer angle, and energization control means for regulating the energization of the drive means on the basis of the second target steer angle thus produced and an actual steer angle of a steering system being controlled, the second control means controlling the drive means on the basis of information representing the target steer angle which is delivered from the first control means.

9. A steering control system according to claim 8 in which the second control means includes steer angle error calculation means for calculating a difference between the second target steer angle and an actual steer angle of a steering system being controlled as a steer angle error, and steer angle error transmit means for transmitting the steer angle error to the first control means at a given period, the first control means including abnormality identifying means for identifying the presence or absence of any abnormality occurring by making reference to the steer angle error which is fed from the second control means.

\* \* \* \* \*